April 7, 1970      F. C. LUSTIG      3,504,965
PORTABLE MOTION PICTURE CAMERA
Filed April 28, 1966      4 Sheets-Sheet 2
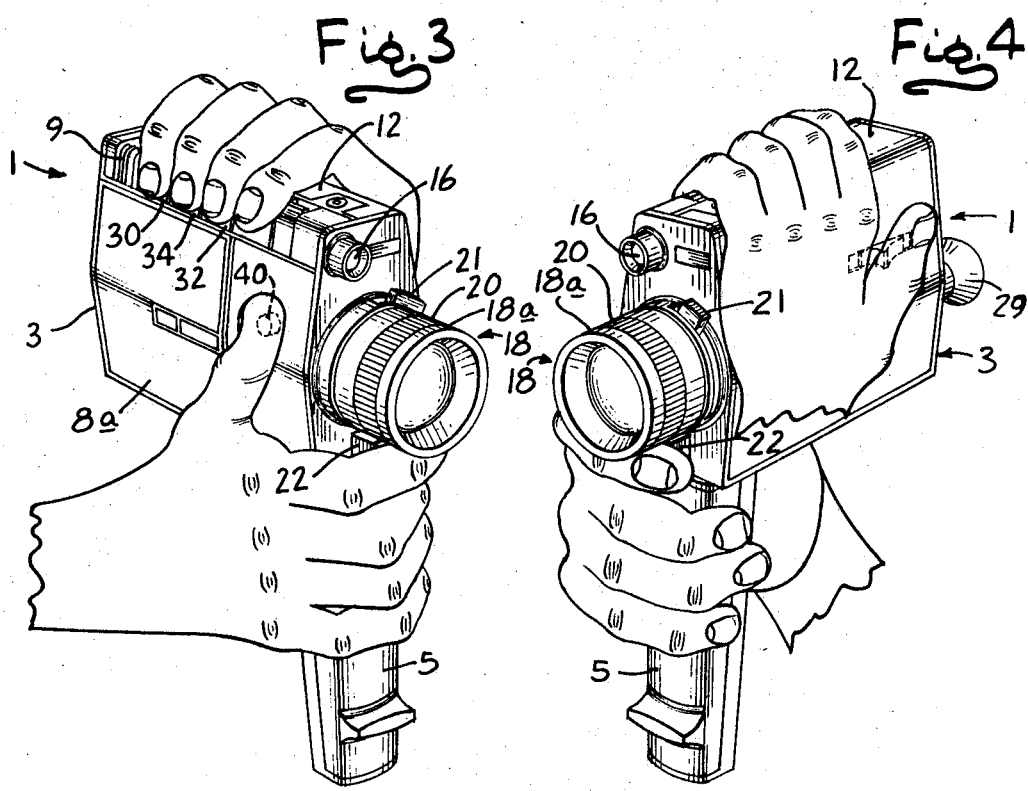
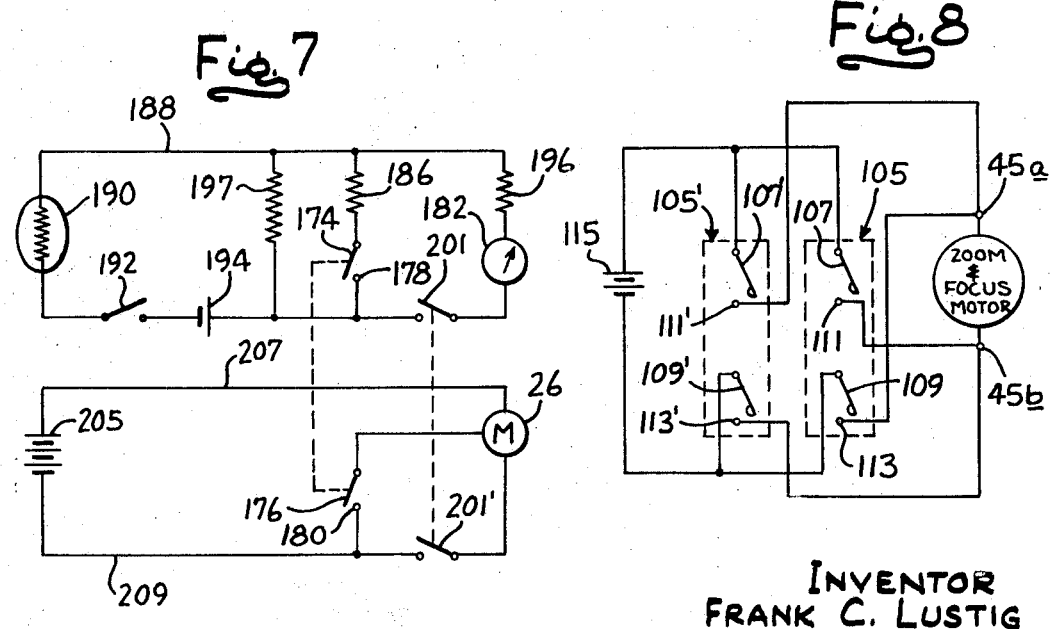
INVENTOR
FRANK C. LUSTIG
by Wallenstein, Spangenberg, Hattis & Strampel
ATTYS.

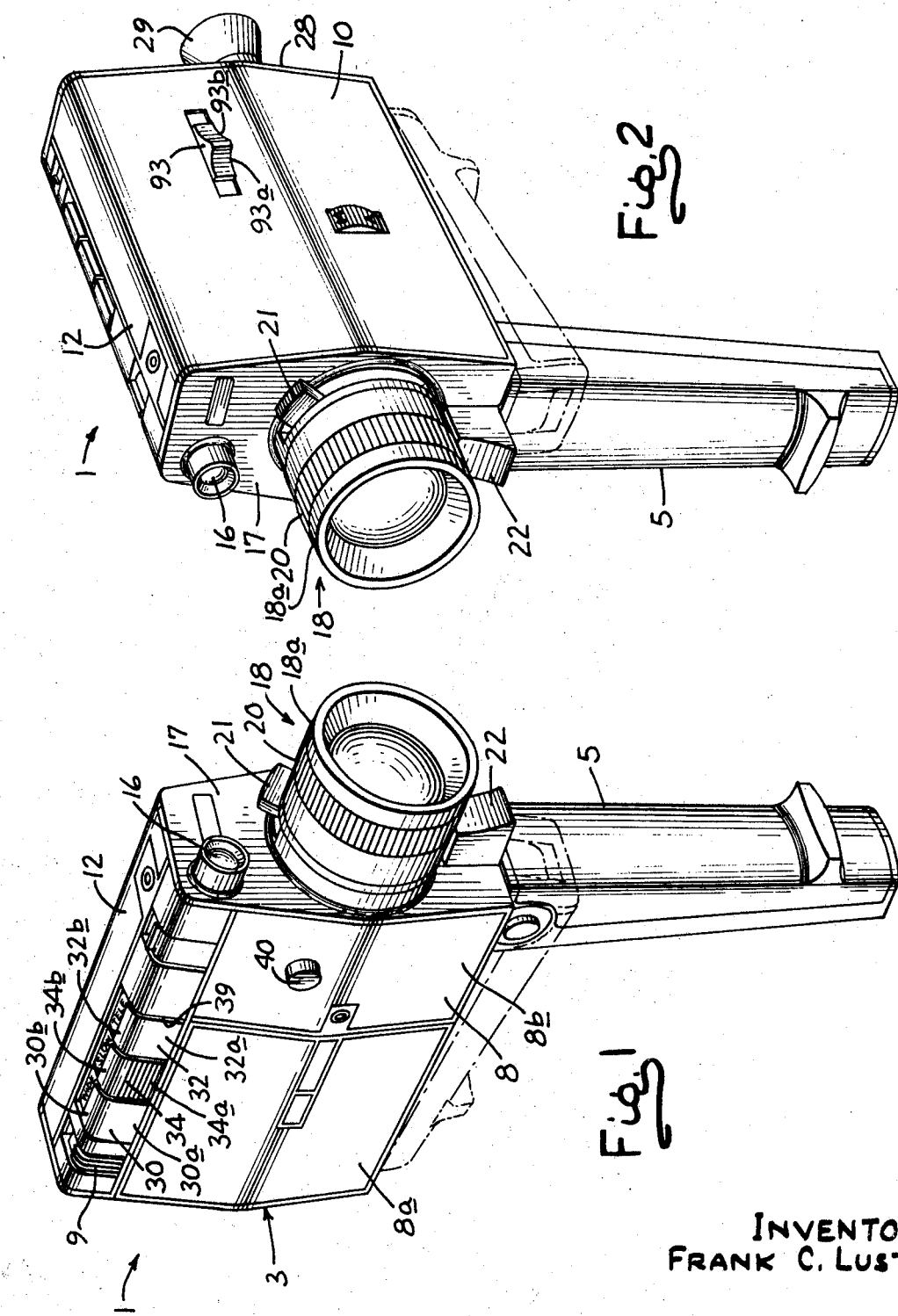

April 7, 1970 F. C. LUSTIG 3,504,965
PORTABLE MOTION PICTURE CAMERA
Filed April 28, 1966 4 Sheets-Sheet 3
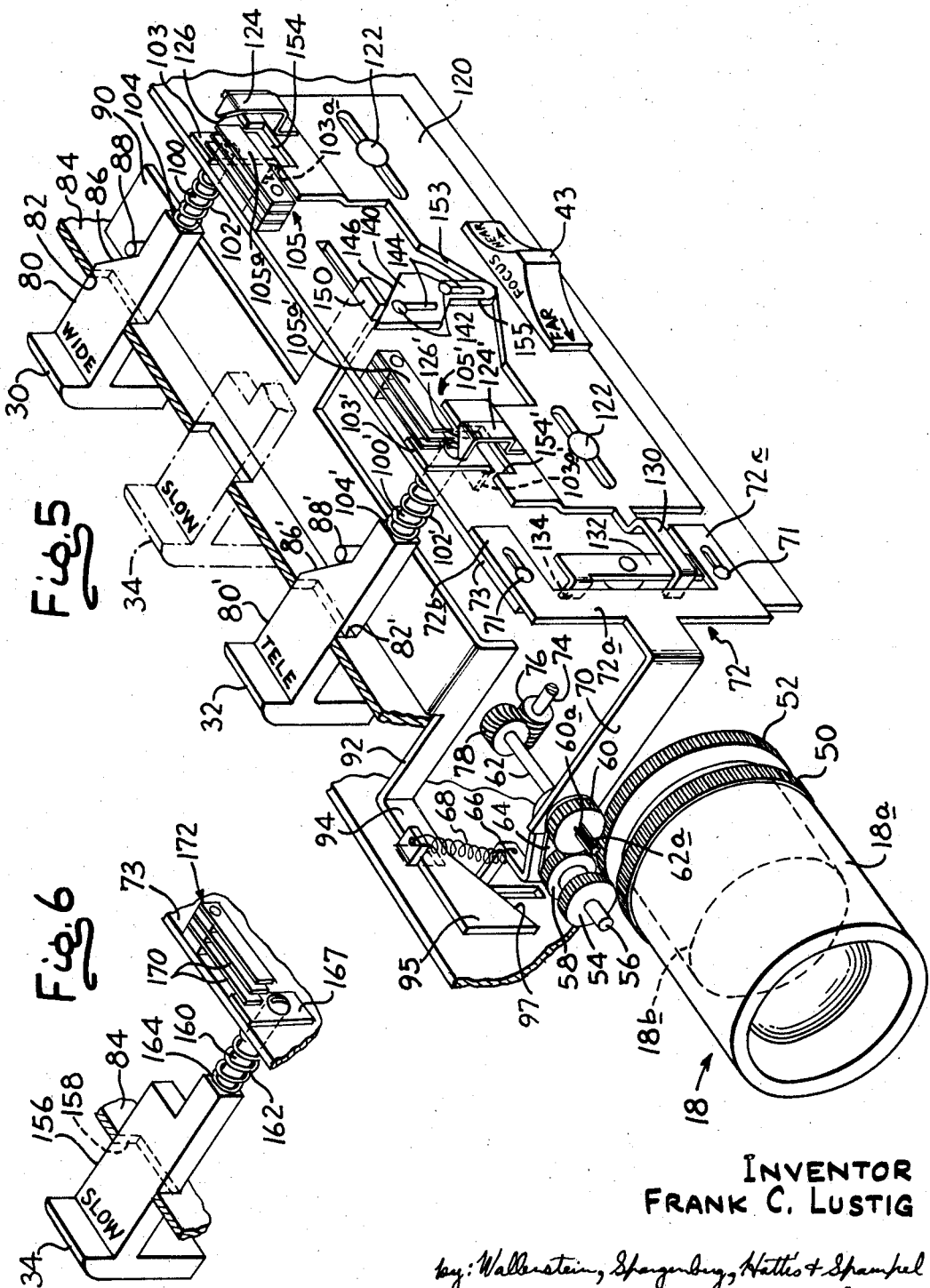
INVENTOR
FRANK C. LUSTIG
ATTYS.

April 7, 1970            F. C. LUSTIG            3,504,965
PORTABLE MOTION PICTURE CAMERA
Filed April 28, 1966                                4 Sheets-Sheet 4
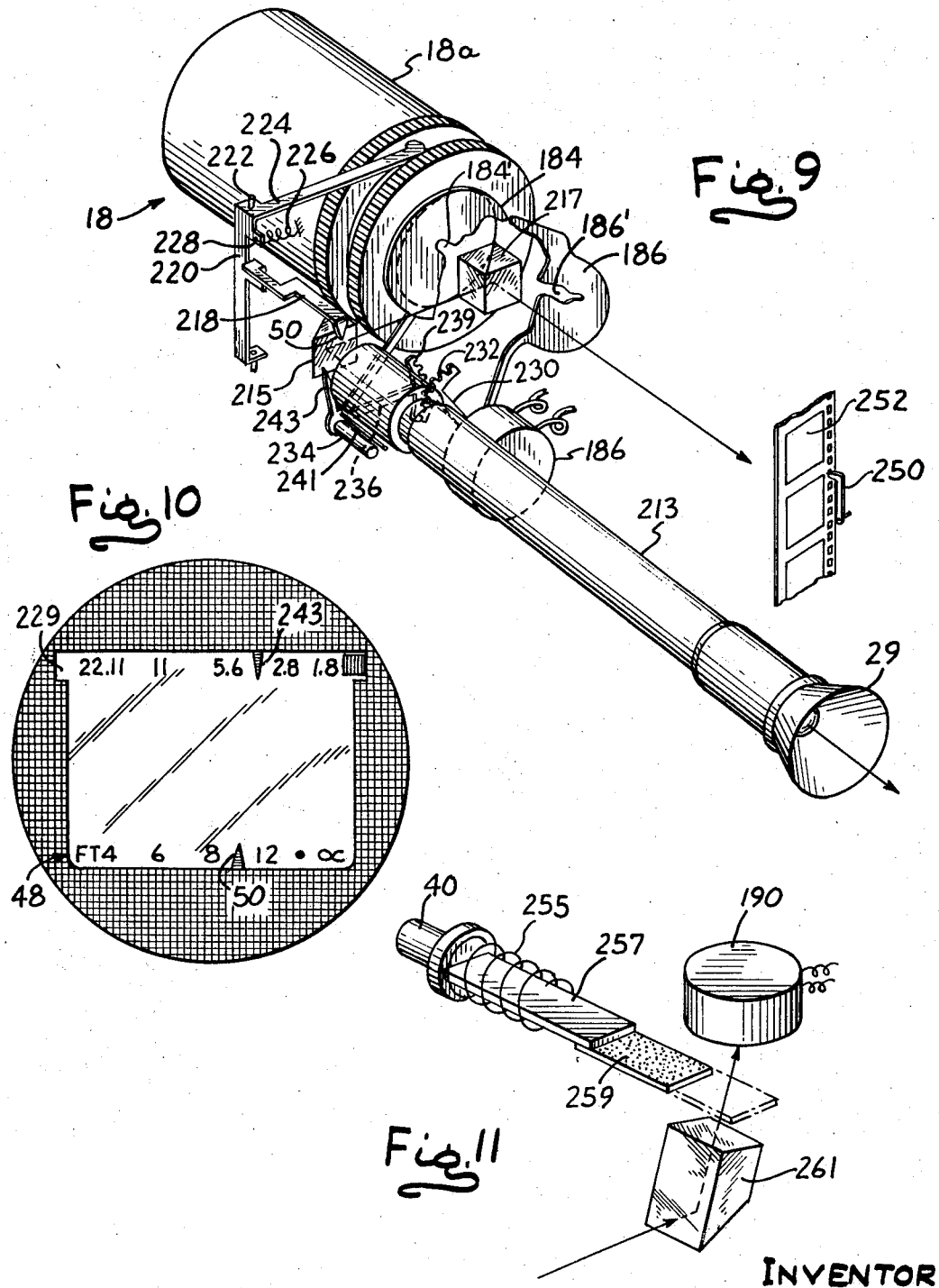
INVENTOR
FRANK C. LUSTIG
by: Wallenstein, Spangenburg, Hattis & Strampel
ATTYS.

United States Patent Office 3,504,965
Patented Apr. 7, 1970

3,504,965
PORTABLE MOTION PICTURE CAMERA
Frank C. Lustig, Highland Park, Ill., assignor to
Argus Incorporated, Chicago, Ill., a corporation
of Delaware
Filed Apr. 28, 1966, Ser. No. 545,925
Int. Cl. G03b 3/06
U.S. Cl. 352—140                                6 Claims

ABSTRACT OF THE DISCLOSURE

A hand held motion picture camera having a plurality of manual controls for various respective motor actuated elements all controls being positioned on a camera housing so that the operator can actuate one, or a plurality of said elements without shifting the position of his hands on the camera housing.

---

This invention relates to portable (i.e. hand held) movie cameras, and more particularly to controls for manually operating such movie cameras, particularly controls for effecting focusing, powered zoom and slow motion operations.

Portable movie cameras have become so sophisticated in recent years with the advent, for example, of automatic zoom, focusing and slow motion controls, that the picture taking process has become quite complex. Prior to the present invention, inadequate attention had been given to the placement and mode of use of the zoom, slow motion and focusing controls to simplify the use of these features and to make them more effective. For example, if during the course of taking a picture the operator decides to operate the zoom, focusing or slow motion controls, the operator frequently must stop the picture taking operation so that he can visually locate the controls involved, and place his fingers on the proper controls, or so that he can make the necessary adjustment in the case of a focusing operation. In the latter case, the operator could not readily change the focusing during a picture taking operation which would be desirable in a pan type shot or when a moving object of interest is approaching or receding from the camera. Even when the operator initially placed one or more fingers on the controls involved so that he could be ready to use them when needed, they were located in positions where the operator was uncomfortable or where only some of the controls could be conveniently overlaid by the fingers of the hand involved, necessitating the movement of one or more fingers to operate a new control whose operation was not initially contemplated.

Accordingly, one object of the invention is to provide uniquely located controls for a movie camera which greatly simplifies the picture taking operation to avoid the difficulties referred to above.

Another object of the invention is to provide a unique focusing control system which greatly simplifies the focusing operation.

In accordance with the invention, the focusing control system of the movie camera which has been commonly a purely manual adjustment, is motorized and provided with a manually operable control means having an inoperative condition and two other conditions which respectively effect progressive movement of a focus lens unit in opposite directions respectively to increase and decrease the distance from the camera an object is in best focus (sometimes referred to as focus distance). In the preferred form of the invention, the focusing control means is a member positioned on the left side of the camera housing to be operated by the thumb of the left hand having the fingers thereof curling over the top of the camera as described above to overlie the aforementioned telephoto, slow motion and wide angle control members. The focusing distance of the lens system of the camera is indicated by a pointer or other indicating means visible in the viewfinder of the camera. When a varying focus distance is desired during a picture taking operation, the aforementioned focusing control member is operated by the thumb of the left hand so the desired focus distance indicated in the viewfinder. The focusing control member is preferably a member which has a spring urged center position and which is slidable forward or backward from this position to move the focusing lens unit progressively in one direction or the other to increase or decrease the focal distance.

The above and other objects, advantages and features of the invention will become more apparent upon making reference to the specification to follow, the claims and the drawings wherein:

FIG. 1 is a perspective view of a movie camera including features of the present invention and showing, among other things, the zoom, slow motion and back light compensation control members on one side of the camera housing;

FIG. 2 is a perspective view of the other side of the camera housing showing, among other things, the focusing control members thereon;

FIG. 3 is a view corresponding to FIG. 1 showing the position of the operator's hands during operation of the movie camera;

FIG. 4 is a view corresponding to FIG. 2 showing the position of the operator's hands during operation of the movie camera;

FIG 5 is an enlarged perspective view of part of the camera of FIGS. 1 through 4 showing, among other things, exemplary mechanism which responds to the zoom controls shown in FIGS. 1 and 3.

FIG. 6 is an enlarged perspective view of part of the slow motion control mechanism of the camera of FIG. 1 through 4;

FIG. 7 illustrates exemplary control circuits associated with the film feed and shutter operating motor and the exposure meter movement;

FIG. 8 shows exemplary circuitry associated with the zoom and focus motor;

FIG. 9 is a perspective view including the lens diaphragm, prism and the viewfinder portion of the camera of FIGS. 1 through 4;

FIG. 10 shows an enlarged view of the viewfinder field seen in the viewfinder; and FIG. 11 illustrates the back light compensation control portion of the camera of FIGS. 1 through 4.

Referring now more particularly to FIGS. 1 through 4, the movie camera there shown, and generally indicated by reference numeral 1, includes a housing 3 having a downwardly projecting handle-forming portion 5 which is pivotable on an axis concentric with a pushbutton 6 into the dashed line position shown in FIG. 1 for compact storage of the same. The depression of the pushbutton 6 releases a lock (not shown) which permits the handle-forming portion 5 to be moved into or out of the dashed line position. The lock automatically latches when the handle-forming portion reaches either position shown in FIG. 1. The handle-forming portion 5 of the housing may contain batteries for operating one or more electric motors to be described.

The housing 3 viewed from the point of reference of the operator of the camera has a right outer side wall 8 and a left outer side wall 10 (FIG. 2). The right outer side wall 8 in the camera housing includes a door-forming panel 8a which swings out on operation of a door release member 9 to expose a cavity within the housing for receiving a film magazine, and a stationary panel 8b. The outer side walls 8 and 10 preferably contain the control members for performing the zoom, slow motion, focus and back light compensation operations of the movie camera to be described. The camera housing further has a top wall 12 which is of relatively narrow extent for reasons to be explained and a front wall 14 from which extends an exposure control window 16, a lens tube assembly 18 and a picture taking control member 22. The lens housing assembly 18 may include a generally conventional focusing lens carrying tube 18a having a narrow knurled ring portion 20 for manually rotating the tube 18a for a manual focusing adjustment, and a generally conventional zoom lens operating tube 18b shown in dashed lines in FIG. 5 which is rotated by a manual zoom adjustment lever 21 projecting from the lens tube 18b. As is well known, when the focusing lens carrying tube 18a is rotated in one direction or the other, the tube is translated forwardly or rearwardly for varying the focal distance of the lens system. Rotation of the zoom lens operating tube in one direction or the other translates a zoom lens carrying frame (not shown) forwardly or rearwardly to vary the magnification and angle of view of the lens system.

The picture taking control member is preferably an outwardly spring urged depressible member 22 which projects forwardly from the front wall 14 of the camera housing below the lens tube assembly 18. As best shown in FIGS. 3 and 4, the picture taking control member 22 is positioned to be engaged by the tip of the first finger of the right hand gripping the handle-forming portion 5 of the camera housing. Depression of the picture taking control member 22 as far as possible will effect energization of a film feeding and shutter operating motor 26 and exposure meter movement (FIG. 7) when automatic exposure control operation is called for. Part way depression of the control member 22 energizes only the exposure meter movement.

The camera housing 3 has a rear wall 28 having a viewfinder eyepiece 29 through which the operator can view the field visible in the lens system, preferably through a reflex lens and prism arrangement like that shown in FIG. 9 later to be described, so that the operator views the scene presented by the light rays passing through the lens system of the camera.

In the preferred form of the invention, there are provided three longitudinally spaced contiguous control members, most advantageously a telephoto zoom control member 30, a slow motion control member 34 and a wide angle zoom control member 32 in the order named arranged most advantageously at the top of the right outer side wall 8 where, with the palm of the left hand engaging the left outer side wall 10 of the camera housing, the fingers of the left hand can curl over the top wall 12 of the housing respectively to overlie the control members 30, 32 and 34, as best illustrated in FIGS. 3 and 4. The top wall 12 of the housing is preferably relatively narrow to accommodate this position of the left hand, which is a very comfortable one for the operator. Such positioning of the left hand permits the left hand to be used to steady the camera, and places all fingers in position to operate at any time the various controls referred to during a picture taking operation.

In the most preferred form of the invention, the control members 30, 32 and 34 are outwardly spring urged depressible members rounded at the top outer margins thereof comfortably to receive the ends of the fingers curling therearound. Moreover, these depressible control members are preferably mounted for inward horizontal movement in the direction of the left outer side wall 10 of the camera housing, so they can be operated by a simple squeezing action. Also, a further advantageous feature of the preferred control members 30, 32 and 34 is that one of the control members, such as the slow motion control member 34, has a rough outer side surface 34a, obtained as by knurling the same, so that the operator can locate his second finger on the control member 34 solely by the sense of feel. This establishes a point of reference so that he can locate the other two fingers over the control members 30 and 32, which are illustrated as relatively smooth surfaced members, also purely by the sense of feel. It is, therefore, apparent that the operator can place his eye behind the viewfinder eyepiece 29 and by the sense of feel place his fingers over the telephoto, wide angle and slow motion control members 30, 32 and 34 so that he is in position to carry out the desired operation at any moment during the picture taking operation. The control members as illustrated have flat top wall surfaces 30b, 32b and 34b and are in substantially the same plane as the top wall 12 of the camera housing and the outer side surfaces 30a, 32a and 34a are in a plane that of the right outer side wall 8 of the camera housing. To this end, the control members 30, 32 and 34 are supported within a recess 39 formed by a cut-out portion encompassing part of the upper extremity of the right outer side wall 8 and the top wall of the camera housing.

A back light compensation control member 40 is shown projecting from the stationary panel 8b of the right outer side wall 8 of the camera housing. The control member 40 is preferable an outwardly spring urged pushbutton which is depressed when the camera is panned into the sun. In a suitable manner, the depression of the control member 40 will artificially enlarge the f-stop opening of the camera to avoid under exposed pictures.

As best shown in FIGS. 2 and 4, the left outer side wall 10 of the camera housing has a focus control means 43 positioned to be operated by the thumb of the left hand positioned as previously described with the palm engaging the left outer side wall 10 and the fingers curling over the top of the camera housing. The focus control means preferably comprises a slide member which is spring urged into an inoperative center position and is slidable forwardly or rearwardly of such center position by the thumb of the left hand, respectively to effect the resultant progressive movement of the focus lens carrying tube 18a forwardly or backwardly progressively to decrease or increase the focus distance. The focus control member 43 preferably has rearwardly and forwardly facing surfaces 43a and 43b respectively to provide the thumb of the operator with convenient pushing and pulling surfaces to simplify the effort required in sliding the control member 43 forwardly and backwardly. The operation of the focus control member 43 in one direction or the other energizes an electric motor 45 (FIG. 8). Of significance in the focusing operation is the fact that the focus distance is indicated at all times in the viewfinder field shown in FIG. 10. Thus, the viewfinder field preferably has a range scale 48 calibrated in appropriate units, such as feet. A focus point indicating means, such as a pointer 50, is visible in the viewfinder field, the pointer 50 being positioned opposite the number on the scale 48 identifying the distance from the camera for optimum focus. Thus, when the operator is panning a scene where the same or varying object of interest has a varying distance from the camera, the desired objective can be kept in proper focus during the panning operation by operating the focus control member 43 in a manner to keep the pointer 50 on the number representing the desired focus distance of the objective involved. This feature of the camera is also useful in taking a picture of a single object moving toward or away from the camera.

In the exemplary camera being described, separate motors are used for operating the film feeding and shutter operating mechanism, on the one hand, and the focus lens carrying and zoom lens operating tubes 18a and 18b on the other hand. The motor for operating the focus lens carrying and zoom lens operating tubes is the aforementioned motor 45 in the circuit of FIG. 8. However, in accordance with the broad aspects of the invention, a single motor could be used for performing all of the operations described requiring a motor.

The particular mechanism and circuitry which are operated by the various control members described above form no part of the present invention. However, to present a more complete disclosure, there will now be described exemplary mechanism and circuitry shown in FIGS. 5 through 11 which respond to operation of the control members described above.

Referring now particularly to FIG. 5, there is there shown on the inner ends of the focus lens carrying tube 18a and the zoom lens operating tube 18b, gear rings 50 and 52 respectively which are adapted selectively to be driven by a pinion gear 54 fixed upon a shaft 56. The shaft 56 also carries a gear 58 which meshes with a drive gear 60 fixed against relative rotation to a shaft 62. The shaft 56 and the gears 54, 58 and 60 are carried upon a pivot plate 64 which forms part of an assembly including an arm 66 normally urged into an upper position by a spring 68. The pivot plate 64 pivots about an axis coaxial of the shaft 62 and when spring urged into this upper position the gear 54 cannot mesh with the lens tube gears 50 and 52. The entire assembly just described including the pivot plate 64 and the components carried thereby are carried upon a transverse arm 70 extending from a C-shaped slide plate 72 which is mounted for horizontal sliding movement on a mounting wall 73. The slide plate 72 includes a vertically extending section 72a from the opposite ends of which horizontally extend wings 72b and 72c which are horizontally slotted to receive pins 71—71 extending from a stationary mounting wall 73.

Normally, the slide plate 72 is urged into a rearward position where the gear 54 is opposite the gear 52 on the zoom lens tube 18b. When a focusing operation is desired, the slide plate 72 is translated forwardly to bring the gear 54 opposite the gear 50 on the focus lens tube 18a. The gears 54, 58 and 60 move with the slide plate 72, but the shaft 62 passing through the gear 60 does not translate with the slide plate 72. Accordingly, the gear 60 is provided with a fluted central opening 60a which slidably receives a correspondingly shaped fluted end portion 62a of the drive shaft 62.

The focus lens carrying tube 18a and the zoom lens carrying frame operated by the zoom lens operating tube 18b are moved forwardly or backwardly by rotating the tubes 18a and 18b clockwise, or counterclockwise and so forward or rearward movement of these tubes is obtained by counterclockwise or clockwise rotation of the gear 54. In the manner to be described, the zoom and focus motor 45 shown in FIG. 8 operates in one direction or the other depending upon whether telephoto or wide angle zoom operation is desired or an increase or decrease in the focus distance is desired. Energization of the motor 45 will result in rotation of a shaft 74 shown in FIG. 5 carrying a worm gear 76 meshing with a worm gear 78 carried on the end of the shaft 62.

The zoom control member 30–32 respectively have shank portions 80–80' slidably mounted within slots 82–82' formed in a vertical wall 84 within the camera housing 3. The control member shank portions 80–80' have inclined cam surfaces 86–86' respectively which engage pins 88–88' carried on a slide plate 90 which is normally spring urged into a forward position shown in FIG. 5. When either the control member 30 or 32 is depressed, the cam surface 86 or 86' engages the pin 88 or 88' and pushes the same rearwardly, moving the slide plate 90 rearwardly.

The forward end of the slide plate 90 has a transverse arm 92 terminating in a forwardly extending arm 94 having a camming head 95 with a forwardly and downwardly inclined cam surface 97. For zoom operation, when the slide plate 90 is moved rearwardly by depression of control member 30 or 32, the cam surface 97 of the camming head 95 depresses the aforementioned arm 66 to pivot the pivot plate 64 downwardly to bring the gear 54 into engagement with the zoom lens tube gear 52.

The shank portions 80–80' of the control members 30–32 carry on the inner ends thereof switch operating rods 100–100' respectively. Surrounding the rods 100–100' are coil springs 102–102' which respectively engage shoulders 104–104' on the end of the shank portions 80 and 80' to urge the control members 30–32 to their outer positions. The rods 100–100' freely pass through holes in the stationary mounting wall 73 and carry on the ends thereof switch operating plates 103–103' adapted to engage and compress contact carrying leaf springs of switch assemblies 105–105' mounted on the wall 73. Normally, the switch asemblies 105–105' provide an open circuit to the zoom and focus motor 45 (FIG. 8). In a manner now to be described, the shaft of the zoom and focus motor 45 is rotated in one direction or the other by varying the conections of a battery 115 to the upper and lower terminals 45a and 45b thereof. Thus, when the wide angle zoom control member 30 is depressed, movable poles 107–109 of the switch assembly 105 make contact with stationary contacts 111–113, respectively to connect the positive and negative terminals of a battery 115 to the bottom and upper terminals, respectively, of the zoom and focus motor 45. This will rotate the shaft of the motor in a direction which will rotate the gear 54 so as to move the zoom lens operating tube 18b in a direction to decrease the magnification of the lens system or, in other words, to provide a wider angle of view in the picture recorded on the film in the camera.

When the telephoto zoom control member 32 is depressed, the switch operating plate 103' will move poles 107'–109' of switch assembly 105' into engagement with stationary contacts 111'–113', respectively to couple the positive and negative terminals of the battery 115 to the upper and lower terminals of the zoom and focus motor 45. This will cause the motor 45 to drive its shaft in the opposite direction to drive the gear 54 in a direction which will move the zoom lens operating tube 18b in a direction to obtain greater magnification of the field of view recorded on the film in the camera.

The exemplary mechanism responding to the operation of the focus control member 43 includes a slide plate 120 mounted for horizontal sliding movement upon pins 122—122 extending from the stationary mounting wall 73. The slide plate 120 carries adjacent its forward end a cam strip 124' which has an inclined cam surface 126' adapted to compress contact carrying leaf springs 105a' of the switch assembly 105' when the slide plate 120 is moved rearwardly or to the right of its neutral position as viewed in FIG. 5, to effect movement of switch poles 107'–109' thereof into engagement with the stationary contacts 111'–113' (FIG. 8). This will energize the zoom and focus motor 45 to rotate the gear 54 in the proper direction to drive the focus lens carrying tube 18a in the appropriate direction to bring the focus point progressively nearer the camera.

Movement of the focus control member 43 and the slide plate 120 to the left will result in the operation of the switch assembly 105 to energize the motor 45 so as to move the focus lens carrying tube 18a in the opposite direction by means including a cam strip 124 secured to the rear end portion of the plate 120, the cam strip 124 having a cam surface 126 which compreses contact carrying leaf springs 105a of the switch assembly 105 to move the poles 107–109 thereof into engagement with stationary contacts 111–113. This reverses the connections of the voltage source 115 to the zoom and focus motor 45 from that occuring when the focus control member was moved to the right.

Movement of the slide plate 120 to the right also effects movement of the C-shaped slide plate 72 carrying the arm 70 and the gear mechanism described in the opposite direction (i.e. to the left) to bring the gear 74 opposite the focus lens tube gear 50. To this end, a curved arm 130 extends forwardly from the front end of the slide plate 120 and curves around the bottom end of a center pivoted lever 132. The upper end of the lever 132 has an ear 134 which, when the curved arm 130 is moved to the right will, due to the resulting counterclockwise rotation of the lever 132, contact and push against the vertically extending section 72a of the C-shaped slide plate 72 to bring the gear 54 opposite the focus lens tube gear 50. Movement of the focus control member 43 to the left to bring the focus point further from the camera will move the C-shaped slide plate 72 to the left due to the engagement of the curved arm 130 directly with the vertical section 72a of the C-shaped slide plate 72.

It will be recalled that meshing of the gear 54 with the focus lens tube gear 50 requires, in addition to the forward movement of the C-shaped slide plate 72, the downward pivoting of the pivot plate 64 carrying the gears 54 and 58 and the shaft 56 thereof. This is accomplished upon operation of the focus control member 43 by means of including a cam member 140 mounted for vertical sliding movement upon pins 142 projecting from the stationary mounting wall 73 and passing through slots 144 in the cam member 140. The cam member 140 has a forwardly and upwardly inclined top surface 146 which, when in the slide plate 120 is moved forwardly or rearwardly, is raised to push an arm 150 extending from the slide plate 90 carrying the aforementioned camming head 95 to the right. The cam member 140 is elevated by either a forward or rearward movement of the slide plate 120 by means including a V-shaped cam surface 153 formed in the upper edge of the slide plate 120. The cam member 140 has a follower portion 155 which, in the neutral position of the slide plate 120, rides in the crotch of the V-shaped cam surface 153. It is thus apparent that a forward or rearward movement of the slide plate 120 from its neutral position will raise the cam member 140 and move the arm 150 and the slide plate 90 from which it extends to the right. As previously indicated, movement of the slide plate 90 to the right will bring the cam surface 97 of the camming head 95 against the arm 66 to pivot the same together with the pivot plate 64 carrying the gears 54, 58 and 60 downwardly to bring the gear 54 into meshing engagement with the focus tube gear 50.

Interlock means are preferably provided for preventing operation of the focus control member 43 when the zoom control members 30 or 32 are operated, and which prevents operation of the zoom control members 30 and 32 when the focus control member 43 is operated. To this end, the switch operating plates 103 and 103' attached to the zoom control members 30 and 32 respectively are provided with legs 103a and 103a' which, when the control members are depressed, are moved into slots 154 and 154' in the upper edge of the slide plate 120 to prevent movement of the plate 120 to any insignificant extent. When the focus control member 43 is moved to the right or left of the neutral position, the portions of the slide plate 120 bordering the slots 154 and 154' will be moved behind the switch operating plates 103 and 103' and thus prevent inward movement of the control members 30 and 32.

Refer now to FIGS. 6 and 7 illustrating the mechanism and circuitry responding to operation of the slow motion control member 34. The slow motion control member 34 has a shank portion 156 which slides within a slot 158 in the aforementioned stationary vertical wall 84 within the housing 3.

The shank portion 156 of the slow motion control member 34 carries a switch operating rod 160 on the end thereof. A coil spring 162 surrounds the rod 160 and engages a shoulder 164 on the end of the shank portion 156 to urge the control member 34 outwardly. The control rod 160 passes through a hole in the mounting wall 73 and carries on the end thereof a switch operating plate 167. The switch operating plate 167 engages and compresses contact carrying left springs 170 of a switch assembly 172 mounted on the wall 73. The springs 170 constitute movable poles 174–176 in the circuit shown in FIG. 7. Upon depression of the slow motion control member 34, the movable poles 174 and 176 engage the stationary contacts 178 and 180, respectively.

The switch pole 174 and associated contact 178 forms part of the energizing circuit for exposure meter movement 182 and the switch pole 176 and associated contact 180 forms part of a circuit for controlling the energization of film feeding and shutter operating motor 26. It is apparent that, for slow motion operation, the film feeding and shutter operating speeds are increased, and so to avoid under exposure it is necessary to increase the F-stop opening of the camera. The F-stop opening can be increased by reducing the current flowing in the exposure meter movement 182 which controls the position of one or more diaphragm blades 184–186 shown in FIG. 9. These blades have the usual overlapping tapered slots 184'–186' which provide a variable sized F-stop opening for the camera. The movable pole 174 is connected in series with a resistor 186 in turn connected to a conductor 188 extending to one terminal of a light responsive device such as a cadmium sulfide cell 190, mounted to intercept light passing through the exposure light window 16 (FIG. 1). The other terminal of the cell 190 is connected to an auto-manual switch 192 which is closed when the diaphragm blades are to be controlled automatically by the meter movement 182. Projecting from the left outer side wall 10 of the camera housing 3 (FIG. 2) is a knurled control wheel 191 which can be moved to a range of manual position or one automatic position. In a manual position, the diaphragm blades take a position determined by the position of the control wheel 191. The auto-manual switch 192 is closed when the control wheel is in its automatic position.

The switch 192 is connected in series with a battery 194 in turn connected to the stationary contact 178. A shunt resistor 197 is connected between conductor 188 and contact 178. A resistor 196 is connected between the conductor 188 and one of the terminals of the exposure meter movement 182 and a normally open switch 201 is connected between the stationary contact 178 and the other terminal of the exposure meter movement 182. The switch 201 is closed when the picture taking operating member 22 is depressed at least part way. When the control wheel 191 is set for automatic operation and a picture is being taken, the current flowing in the meter movement will vary with the intensity of the light falling on the cell 190 and upon operation of the slow motion control member 34, resistor 186 is connected in parallel with the meter movement to shunt part of the current from the meter movement to artificially create a condition where the light intensity is lower than it actually is so that the F-stop opening provided by the diaphragm blades 184–186 is larger to prevent underexposure during the higher shutter and film feeding speeds obtained during slow motion operation.

The energizing circuit for the film feeding and shutter operating motor 26 includes a conductor 207 connecting one of the terminals of a source of direct current voltage 205 to one of the terminals 26a of the motor 26 and a conductor 209 extending between the other terminal of the source of direct current voltage 205 and a normally open run switch 201' which is ganged for operation with the aforesaid switch 201 but which closes only when the picture taking control member 22 is fully depressed. The aforementioned movable pole 176 and stationary contact 180 of the slow motion operating switch assembly 172 are connected across terminals 26b and 26c of the motor 26 so that upon engagement of the movable pole 176 with the contact 180 the motor will speed up the desired amount. This shorting of the motor terminals can, for example, short out part of the field winding for the motor 26 to speed up the motor in a well known manner.

Refer now to FIGS. 9 and 10 which illustrate the apparatus associated with the viewfinder portion of the camera. As there shown, the viewfinder includes a long tube 213 for directing light rays reflected off a prism 215 to the eyepiece 29. The prism 215 receives light rays deflected from a prism element 217 mounted behind the lens tube assembly 18 and in front of the diaphragm blades 184 and 186. The prism 217 reflects only a small percentage of the light impinging thereon onto the prism 215. The scale markings of the viewfinder field can be placed on the prism 215 or on a transparent plate located at any point in the path of the viewfinder light rays.

The previously mentioned focus distance pointer 50 may be the turned down end portion of a generally horizontally extending arm 218 secured to a vertical frame piece 220 pivoted for rotation about a vertical pivot rod 222. A follower arm 224 extends horizontally from the upper end of the frame piece 220. The frame piece and the follower arm 224 are urged in a counterclockwise direction as viewed in FIG. 9 by a spring 226 anchored between a stationary portion of the housing interior (not shown) and a tab 228 projecting from the vertical frame piece 220. The end of the follower arm 224 is urged against the rear surface of the focus lens carrying tube 18a and follows its forward and backward movement. Thus, the angular position of the vertical frame piece 220 is a measure of the focus distance of the lens system. The pointer 50 extends down in front of the prism 215 and thus casts a shadow in the viewfinder field, as shown in FIG. 10. The shadow appears at the bottom of the viewfinder field as a result of the inversion of the light rays by a lens system (not shown) in the viewfinder tube 213.

The upper margin of the viewfinder field is provided with a scale 229 which identifies the different f-stops presented by the diaphragm blades 184 and 186, as shown in FIG. 9. The diaphragm blade 186 is connected to the shaft of the meter movement 182. An arm 230 also connected to the shaft of the meter movement has a segmental gear section 232 on the end thereof which meshes with another corresponding segmental gear section 234 extending from an arm 236 connected to a counter weight frame 239 pivoted for movement about a horizontal pivot pin 241. The counter weight frame 239 carries a pointer 243 which extends upwardly in front of the prism 215 to cast a shadow on the scale 229 in the field of the viewfinder, as shown in FIG. 10. It is apparent that as the diaphragm blades 184 and 186 are rotated by the meter movement 182, the pointer 243 will assume different positions relative to the scale 229 which is calibrated so that the pointer will indicate the f-stop opening defined by the slots of the diaphragm blades.

It will be recalled that the back light compensation control member 40 is depressed to provide a much larger diaphragm opening than the automatic diaphragm control system of the camera provides when panning into the sun. One way in which the back light compensation can be obtained is illustrated in FIG. 11. As there shown, a suitable coil spring 255 is provided which normally urges the control member 40 outwardly. Fixedly connected to the inner end of the control member 40 is a carrier plate 257 to which is connected a semi-transparent light retarding plate 259. When the control member 40 is depressed, the light retarding plate 259 is moved into the path of the light rays directed to the cadmium sulphide cell 190 to reduce the light striking the cell, thus artificially creating a condition of apparent lesser light intensity at the exposure control window 16, so that the diaphragm blades 184 and 186 will move into a position which provides a much larger f-stop opening. FIG. 11 shows a reflecting prism 261 mounted behind the exposure control window 16 for directing light to the cell 190.

It should be understood that numerous modifications may be made in the preferred form of the invention illustrated in the drawings without deviating from the broader aspects of the invention.

I claim:

1. In a hand held movie camera having a housing containing film feeding and shutter operating mechanism, a lens system including a movable lens focusing means which is movable between opposite extreme positions for bringing points at varying distances from the camera into focus upon a given film-receiving plane within the housing; zoom means movable between extreme positions for varying the angle of view of the lens system; a viewfinder for displaying to the operator the field of view to be recorded on the film; motor means in said housing; a manually operable picture taking control member on the outside of said housing which is operable by one of the hands of the operator for effecting movement of said film feeding and shutter operating mechanism by said motor means; and manually operable zoom control means on the outside of said housing which selectively is operable to telephoto and wide angle positions for operating said motor means to move said zoom means in one direction or the other; the improvement comprising: manually operable focus control means on the outside of said housing which has a first inoperative condition, a second condition for effecting movement of said lens focusing means by said motor means in one direction and a third condition for effecting movement of said lens focusing means by said motor means in the opposite direction; range indicating means including an indicator visible in said viewfinder and movable with said lens focusing means for indicating the range at which the subject viewed in the viewfinder is in maximum focus; operation of said picture taking control member and the operation of said manually operable focus control means either to said second or third conditions being simultaneously operable to effect movement of said film feeding and shutter operating mechanism and said movable lens focusing means during a picture taking operation; and the picture taking control member manually operable zoom control means and said manually operable focus control means being positioned simultaneously to be overlaid by different portions of the operator's hands while supporting the camera in a picture taking position so all of the aforesaid operations can be carried out without shifting fingers between the different controls.

2. The movie camera of claim 1 wherein movement of said manually operable focus control means to either of said second or third conditions will effect operation of said lens focusing means independently of the operation of said film feeding control member.

3. The movie camera of claim 1 wherein said manually operable focus control means is a single member spring biased to said normal inoperative position, said second condition of operation of said focus control means being a position of the focus control member effected by movement thereof in one direction from said inoperative position and said second condition of said manually operable focus control means being a position of the focus control member effected by movement thereof in the opposite direction from said inoperative position thereof.

4. The movie camera of claim 1 wherein said housing has upwardly extending outer side walls and is provided with a portion to be grasped by one hand of the operator for supporting and aiming the camera, said manually operable zoom control means being positioned on the upper portion of the housing to be operated by one or more fingers of the other hand of the operator whose palm engages one of said housing side walls while the latter fingers extend over the top of the housing to overlie said zoom control means; and said manually operable focus control means is positioned on the camera housing to be engaged by a portion of said other hand other than said fingers.

5. The movie camera of claim 4 wherein the manually operable zoom control means comprise two depressible push button controls respectively overlaid by different fingers of said other hand.

6. The movie camera of claim 1 wherein said housing is provided with a hand gripping portion to enable the operator to support and aim the camera, said manually operable picture taking control member being located on said housing so as to be engaged by a finger of said one hand, and said manually operable focus control means being adapted to be overlaid by different portions of said other hand.

References Cited

UNITED STATES PATENTS

| | | |
|---|---|---|
| 1,407,357 | 2/1922 | Tartara. |
| 2,174,529 | 10/1939 | Proctor. |
| 2,198,417 | 4/1940 | Scheibell. |
| 3,240,143 | 3/1966 | Koeber et al. |
| 1,620,727 | 3/1927 | Howell. |

FOREIGN PATENTS

| | | |
|---|---|---|
| 650,252 | 10/1962 | Canada. |
| 1,145,910 | 3/1963 | Germany. |
| 1,324,767 | 3/1963 | France. |

JULIA E. COINER, Primary Examiner

U.S. Cl. X.R.

352—171, 242, 243